United States Patent [19]

Lear et al.

[11] Patent Number: 6,083,420
[45] Date of Patent: Jul. 4, 2000

[54] METHOD FOR DECREASING THE PROPENSITY FOR PHASE-OUT OF THE HIGH MOLECULAR WEIGHT COMPONENT OF DOUBLE METAL CYANIDE-CATALYZED HIGH SECONDARY HYDROXYL POLYOXYPROPYLENE POLYOLS

[75] Inventors: Jeffrey J. Lear, Charleston, W. Va.; Oliver D. Sloan, Saint Maximin, France; José F. Pazos, Havertown, Pa.

[73] Assignee: Bayer Antwerp N.V., Antwerp, Belgium

[21] Appl. No.: 09/356,625

[22] Filed: Jul. 19, 1999

Related U.S. Application Data

[62] Division of application No. 08/805,788, Feb. 25, 1997, Pat. No. 5,958,994.

[51] Int. Cl.$^7$ .................................................... C07C 43/18
[52] U.S. Cl. ...................... 252/182.24; 521/174; 568/624
[58] Field of Search ........................ 252/182.24; 521/174; 568/624

[56] References Cited

U.S. PATENT DOCUMENTS

| | | |
|---|---|---|
| 3,393,243 | 7/1968 | Cuscurida . |
| 4,282,387 | 8/1981 | Olstowski et al. . |
| 5,010,187 | 4/1991 | Heuvelsland . |
| 5,114,619 | 5/1992 | Heuvelsland . |
| 5,470,813 | 11/1995 | Le-Khac . |
| 5,482,908 | 1/1996 | Le-Khac . |
| 5,648,559 | 7/1997 | Hager ...................................... 568/620 |
| 5,728,745 | 3/1998 | Allen et al. ................................. 36/25 |

OTHER PUBLICATIONS

ASTM D–2849–69, Testing Urethane Foam Polyol Raw Materials, pp. 913–931, Dec. 1969.

*Primary Examiner*—John M. Cooney, Jr.
*Attorney, Agent, or Firm*—Joseph C. Gil

[57] ABSTRACT

During polyoxyalkylation in the presence of certain double metal cyanide catalysts, a very high molecular weight hydrophobic fraction, i.e. a "tail", is produced during preparation of high secondary hydroxyl polyols which is believed to contribute to foam collapse in polyurethane foam formulations. The processing latitude of such foams may be improved by altering the hydrophile/lipophile balance of the high molecular weight tail by oxyalkylating with a mixture of ethylene oxide and higher alkylene oxide during the greatest portion of total oxyalkylation such that essentially pure higher alkylene oxide is present in a terminal portion of oxyalkylation not exceeding 15 weight percent of total polyol weight.

12 Claims, No Drawings

METHOD FOR DECREASING THE PROPENSITY FOR PHASE-OUT OF THE HIGH MOLECULAR WEIGHT COMPONENT OF DOUBLE METAL CYANIDE-CATALYZED HIGH SECONDARY HYDROXYL POLYOXYPROPYLENE POLYOLS

This is a division of application Ser. No. 08/805,788, filed Feb. 25, 1997 which is now U.S. Pat. No. 5,958,994.

TECHNICAL FIELD

The present invention pertains to polyoxypropylene polyols. More particularly, the present invention pertains to high secondary hydroxyl-terminated polyoxypropylene polyols prepared by the double metal cyanide-catalyzed oxypropylation of a suitably hydric initiator, and to a method of altering the structure of a high molecular weight component of such polyols so as to decrease their propensity toward phase-out in polymerizing polymer systems.

BACKGROUND ART

Polyoxyalkylene polyether polyols are now a mainstay of the polyurethane industry, and have a myriad of other uses outside of polyurethanes as well, e.g. as surfactants, fat substitutes, and the like. While higher alkylene oxides such as butylene oxides and higher α-olefin oxides are used in the preparation of some polyether polyols, particularly those used as surfactants, the majority of polyether polyols produced today are prepared by polyoxyalkylation with ethylene oxide, propylene oxide, or mixtures thereof, in either block, random, or block random fashion. Oxyalkylation has been generally conducted in the presence of a basic metal catalyst such as sodium hydroxide, potassium hydroxide, or an alkali metal alkoxide. Such catalysts are relatively inexpensive, and readily available.

During base catalyzed oxyalkylation with propylene oxide, however, a competing rearrangement of propylene oxide into allyl alcohol during the course of the reaction continually introduces a monohydroxylfunctional molecule, which itself is capable of being oxyalkylated. Thus, as the reaction progresses, more and more monofunctional species and their oligomeric oxyalkylated products accumulate, reducing the average functionality of di- and poly-functional polyols and broadening their molecular weight distribution as well. Discussion of the mechanism of this rearrangement is discussed in *BLOCK AND GRAFT POLYMERIZATION*, v. 2, Ceresa Ed., John Wiley & Sons, on pages 17–21. The monol content in conventionally base catalyzed polyoxypropylene polyols is ascertained by measuring unsaturation content, for example by ASTM D-2849-69, "Testing Urethane Foam Polyol Raw Materials", and is generally in the range of 0.08 meq/g to 0.10 meq/g or higher.

For example, in the production of a 2000 Da (Dalton) equivalent weight polyoxypropylene diol, it is not uncommon for the mol percentage of unsaturated monofunctional species to approach 30–40%, lowering the theoretical functionality of 2 to a functionality in the range of 1.6 to 1.7. It is believed by some that the high monofunctionality of the polyols produced through base catalysis places a severe limitation on the ultimate molecular weight of polymers obtained therefrom due to the ability of the monofunctional species to act as chain terminators during polymerization. Moreover, the presence of the unsaturated allyl group may sometimes have deleterious effects associated with the reaction of the allylic double bond or its oxidation into a variety of oxidation products. Thus, attempts have been made to reduce the amount of monofunctional species as reflected by measuring the unsaturation content of polyether polyols.

For example, use of rubidium and cesium hydroxide as oxyalkylation catalysts in place of the normally used sodium and potassium hydroxides has been found to lower the degree of unsaturation as disclosed in U.S. Pat. No. 3,393,243. However, the decrease is somewhat modest and the catalysts are far more expensive. Use of barium and strontium hydroxides and oxides is disclosed in U.S. Pat. Nos. 5,010,187 and 5,114,619. In addition to being far more expensive than alkali metal hydroxides, both barium and strontium, particularly the latter, are relatively toxic. Thus, little if any commercialization of such processes have been made. The use of metal naphthenates, optionally in conjunction with tertiary amine co-catalysts, has been shown to be capable of producing polyoxyalkylene polyols of modest molecular weights with unsaturations as low as 0.02 to 0.04 meq/g. See, e.g., U.S. Pat. No. 4,282,387. However, these polyols still contain an appreciable monofunctional content, and have been shown to be little different their behavior in polymer systems from higher unsaturation polyols produced through conventional base catalysis.

In the decade of the 1960's, non-stoichiometric double metal cyanide catalysts, i.e. the glyme adduct of zinc hexacyanocobaltate, were shown to be efficient catalysts for polyoxyalkylations and various other reactions as well. In addition to possessing relatively high rates of reaction, the double metal cyanide catalysts were found to be capable of producing polyols with relatively low unsaturation content, with unsaturations in the range of 0.018 to 0.020 easily obtainable. However, due to the greater cost of these catalysts, coupled with the difficulty of removing them from the finished polyol product, commercialization of such systems did not materialize. Interest in DMC catalysts resurfaced in the 1980's, and improvements in the catalytic activity coupled with new and improved methods of removal from the finished product resulted in commercialization of DMC catalyzed polyol production for a short period of time. The polyols produced by these improved DMC catalysts exhibited unsaturation in the range of 0.015 to 0.018 meq/g.

Recent further improvements in the activity of DMC catalysts by the ARCO Chemical Company has once again resulted in commercialization of DMC catalyzed polyoxyalkylene polyols under the tradename ACCLAIM™ polyols. The catalytic activity of the new DMC catalysts has been improved to such an extent that frequently the rate of polyoxyalkylation is limited by the ability to transfer heat from the polymerization reactor rather than by the activity of the catalyst. The decreased processing time increases the cost/benefit ratio of the catalysts, encouraging their commercial use.

The availability of ultra-low unsaturation polyoxyalkylene polyols has not proven to be the panacea expected. The polyols have not proven to be drop-in replacements for conventionally catalyzed polyether polyols, and in fact, polyether polyols produced by DMC catalysts having unsaturation in the range of 0.003 to 0.010 meq/g have surprisingly been found to be quantitatively different from other, "low" unsaturation polyoxyalkylene polyols, even those produced by prior generation DMC catalysis. Although a portion of the differences between ultra-low unsaturation polyether polyols, low unsaturation polyols, and conventional polyoxyalkylene polyols can be attributed to the differences in functionality, molecular weight distribution, and lack of monofunctional species, the manner in which each of these properties affects both polyurethane formulation and the polyurethanes obtained therefrom is not fully understood. In many cases, for example, improved polyurethane products could indeed be produced, but only by unusual and non-obvious changes in formulation and processing parameters. The anomalous behavior of ultra-low unsaturation polyoxyalkylene polyols and the reasons therefore are still being investigated. One example of this anomalous behavior is the collapse of polyurethane foam systems which employ high secondary hydroxyl content ultra-low unsaturation polyoxypropylene polyols, while similar systems employing conventional polyols produced good foams.

It has been recently discovered that polyoxypropylations with some double metal cyanide catalyst systems, particularly those capable of producing ultra-low unsaturation polyether polyols, also produce a very small but significant quantity of very high molecular weight product. The existence of this very high molecular weight "tail" was not expected, as double metal cyanide catalysts are known to produce polyether polyols of very low polydispersity, with polydispersities on the order of 1.07 to 1.20 being routinely achieved. This polydispersity is far lower than those obtainable with alkali metal catalysis and other methods of catalyzing the oxyalkylation, and gel permeation chromatography shows a relatively tight and narrow distribution of molecular weights.

Upon careful analysis of larger quantities of polyol, concentrating on the portion eluting significantly prior to the main product peak, a very high molecular weight component was surprisingly discovered. Careful analysis of this high molecular weight "tail" indicates that it is composed mostly of polyoxypropylene polyols having molecular weights in excess of 100,000 Da. Once being appraised of the existence of the high molecular weight tail, the reasons for its production may be hypothesized. Without wishing to be bound to any particular theory, Applicants believe that the non-stoichiometric double metal cyanide catalysts contain a very minor portion of catalytic sites for which the transfer coefficient is exceptionally small. While the vast majority of catalytic sites exhibit rapid substrate transfer, resulting in a very narrow and tight molecular weight band, a small fraction of the catalytic sites may exhibit virtually no transfer whatsoever, thus producing at those sites a higher and higher molecular weight product. Applicants believe that this high molecular weight tail may be one facet of the explanation of the anomalous behavior of DMC catalyzed ultra-low unsaturation polyether polyols in some applications.

One example is the production of polyurethane foam from high secondary hydroxyl polyoxypropylene polyols. It is known that the hydrophilicity and hydrophobicity of polyethers is affected by molecular weight. Further, it is believed that the high molecular weight species is virtually all polyoxypropylene homopolymer. Thus, while ethylene glycol, oligomeric ethylene glycols, and even high molecular weight polyoxyethylene glycols are all hydrophilic to some degree, polyoxypropylene glycols are hydrophilic only up to a molecular weight of approximately 500 Da, following which they become increasingly hydrophobic. This phenomenon has been utilized in the preparation of polyoxyethylene/polyoxypropylene block copolymers useful as nonionic block surfactants.

In the production of polyurethane foam, the foam chemistry is very critical. For example, acceptable polyurethane foams are rarely obtained when incompatible polyols are utilized in the foam formulation. An incompatible polyols is one which is insoluble or of limited solubility in the unreacted or partially reacted foam forming ingredients. This is one reason polyethylene glycols are rarely used in foam formulations except in most minor amounts, as the polyoxyethylene polyols are generally of very limited solubility in the reactive components. On the other hand, polyoxypropylene polyols of modest molecular weight tend to be compatible in this respect. During the condensation polymerization which takes place during foam formation, the growing polyurethane and/or polyurethane/urea polymers increasingly incorporate relatively polar urethane and urea groups, thus altering the hydrophile/lipophile balance of the growing polymer chain. It is believed that foam collapse occurs in foam formulations employing high secondary hydroxyl, ultra-low unsaturation DMC catalyzed polyoxypropylene polyols having a high molecular weight tail, because the high molecular weight tail, being exceptionally hydrophobic, tends to phase out, or separate from the growing polymer matrix, disrupting cell walls and eventually causing foam collapse.

Elimination of the high molecular weight tail from polyoxyalkylene polyols containing such a tail by removing the latter is virtually impossible, as in general, the polyoxyalkylene polyol products are of far too high a molecular weight for efficient distillation, even with methods such as falling film evaporation or wiped film evaporation, and moreover, such evaporative processes are relatively expensive, adding unwanted cost to the polyether product. If a method of precipitating the high molecular weight tail could be found, the high molecular weight portion could be filtered out. However, filtration of relatively viscous polyols is a long and expensive process. Again, the cost benefit ratio would dictate against the use of such a method even if such a method were available.

It would be desirable to produce low and ultra-low unsaturation, high molecular weight polyoxyalkylene polyols with high secondary hydroxyl content wherein the phase-out of the high molecular weight tail during polyurethane formation is markedly decreased or eliminated. It would further be desirable to produce a polyether polyol product wherein the high molecular weight tail is less hydrophobic than a polyoxypropylene homopolymer.

SUMMARY OF THE INVENTION

It has now been surprisingly discovered that the propensity toward phase-out of the high molecular weight tail of high secondary hydroxyl polyoxyalkylene polyols prepared from higher alkylene oxides in the presence of double metal cyanide complex (DMC) catalysts may be substantially decreased if, during at least the first 80% of polyol production, a mixture of higher alkylene oxide and ethylene oxide, for example but not by limitation, a mixture containing ethylene oxide in an amount from about 0.5 to 15 weight percent, is utilized as the alkylene oxide mixture.

DESCRIPTION OF THE PREFERRED EMBODIMENTS

The claimed polyoxyalkylene polyols and method for their production are both limited to polyoxyalkylene polyols prepared from at least one higher alkylene oxide and which have a high molecular weight tail, i.e. a high molecular weight fraction having a molecular weight higher than about 100,000 Da. By "higher alkylene oxide" is meant propylene oxide, butylene oxide, or other alkylene oxide which is capable of polymerization to form hydrophobic species. Ethylene oxide, for example, does not form hydrophobic species. Moreover, homopolymerization of ethylene oxide is generally conducted with basic catalysts, even to very high molecular weights, as ethylene oxide is not subject to rearrangement as are propylene oxide and other higher alkylene oxides. Furthermore, ethylene oxide in general, cannot be homopolymerized by DMC catalysts, as such polymerizations generally produce somewhat intractable mixtures containing a variety of polymeric products whose identity has not been ascertained, but which are believed to contain ultra-high molecular weight polyoxyethylene waxes in conjunction with lower molecular weight and oligomeric polyoxyethylene glycols. Preferably, the higher alkylene oxide is propylene oxide, or propylene oxide in admixture with one or more butylene oxides or oxetane.

The presence of the high molecular weight tail can be verified by gel permeation chromatography of a polyol sample. The high molecular weight tail will have a molecular weight in excess of 80,000 Da for polyols with average equivalents weights of from about 1,000 Da to about 15,000 Da. Most often, the high molecular weight tail will have a molecular weight of c.a. 100,000 Da or higher for such polyols. The terms "average molecular weight" and "equivalent weight" refer to number average molecular weight and number average equivalent weight herein unless indicated otherwise.

While gel permeation chromatography is a useful method of detecting the presence of the high molecular weight tail, its presence can be more easily and rapidly detected qualitatively by employing a high secondary hydroxyl polyol in a highly stressed foam formulation. For example, a suitable highly stressed foam formulation is given in Example 1 of the subject invention. This foam formulation employs ingredients typical of foam formulations employing high secondary hydroxyl polyols, i.e. conventional surfactants, catalysts, etc. High secondary hydroxyl polyols are generally homopolymeric polyols produced from all propylene oxide. If such a polyol is produced with an ultra-low unsaturation DMC catalyst, the presence of significant amounts of high molecular weight tail will be shown by the foam's collapse. Thus, either gel permeation chromatography or other suitable method of analyzing the polyol in terms of the molecular weights of its various fractions, or the collapsing foam test may be used to detect the presence of the high molecular weight tail.

To reduce the effect of the high molecular weight tail in accordance with the subject invention, it has been found necessary to conduct the DMC catalyzed oxyalkylation in the presence of ethylene oxide for a substantial part of the oxyalkylation. If ethylene oxide is present during the entire oxyalkylation, then a polyol of higher primary hydroxyl content is obtained, which is generally not desired. If the oxyalkylation is conducted in the presence of ethylene oxide for less than about 80% of the total oxyalkylation, i.e. if the last 20% or more of the oxyalkylation is conducted with all propylene oxide or other higher alkylene oxide, then it is found that the solubility parameter of the high molecular weight tail is such that phase-out is likely to occur during polyurethane formation.

If, however, less than 20% of the total oxyalkylation, and in particular, less than 20%, preferably less than 15%, and most preferably 12% or less of the final portion of the total oxyalkylation is conducted with propylene oxide, then the hydrophile/lipophile balance of the high molecular weight tail will be such so as to minimize phase-out from a growing polyurethane or polyurethane/urea chain. This is evidenced by foam stability rather than foam collapse. Without wishing to be bound to any particular theory, it is believed that even the relatively small percentage of ethylene oxide present causes a portion of the alkylene oxide residues of the high molecular weight tail to be ethylene oxide-derived, lowering the hydrophobicity of this portion of the product significantly without being present in the desired lower molecular weight fraction to an extent which prohibits its use in polyurethane foam systems.

Not all DMC catalysts which are capable of producing ultra-low unsaturation polyether polyols will demonstrate the formation of a high molecular weight tail. At times, even the same DMC catalyst in slightly different physical forms may produce polyols with differing high molecular weight tails or even lack of high molecular weight tail. Thus, for any given polyol it is first necessary to determine whether a high molecular weight tail having an undesirable hydrophile/lipophile balance is obtained during normal polyoxyalkylation. To determine this, a high secondary hydroxyl content polyoxyalkylene polyol is prepared by oxyalkylation without ethylene oxide being present. For example, but not by way of limitation, a di- to octa-hydric initiator may be oxyalkylated with propylene oxide in the presence of the DMC catalyst to produce for example, a polyoxypropylene polyol having an equivalent weight of about 6,000. This polyol product may be examined by GPC and/or by the collapsing foam test to ascertain whether the high molecular weight tail is present, and if so, whether modification of its hydrophobicity should be made in order to avoid foam collapse. If a significant high molecular weight tail is found to be present, then the effect of this high molecular weight tail on developing foam can be reduced by preparing an otherwise similar polyol, but employing from about 0.5 to about 15% ethylene oxide during a substantial part of the oxyalkylation, for example, for substantially all of the initial oxyalkylation up to the point where a final oxypropylene or other higher alkylene oxide derived terminal block is necessary to produce a high secondary hydroxyl cap.

For example, it has been found highly advantageous to conduct the initial polyoxyalkylation with propylene oxide up to an equivalent weight of about 500. This initial polyoxyalkylation may take place in the presence of a DMC catalyst, or a conventional catalyst such as, but not limited to, the catalytic systems previously described. If this initial oxyalkylation takes place in the presence of a conventional basic catalyst, then the oligomeric polyol must be treated to remove catalyst, otherwise the DMC catalyst may be inactivated. Following oligomeric polyoxyalkylation, oxyalkylation is continued with a mixture of ethylene oxide and propylene oxide containing less than 15% ethylene oxide, more preferably less than 10% ethylene oxide, and yet more preferably ethylene oxide in an amount from about 1 weight percent to about 5 weight percent up to the point where 85% or thereabouts of the final polyol target weight has developed, following which the polymerization is conducted with all propylene oxide. It is most preferable that no more than the last 15% of the oxyalkylation be conducted with higher alkylene oxide, preferably, no more than 12%, and most preferably about 6.5% or less. However, if less than about 5% of the final oxyalkylation is conducted with propylene oxide or other higher alkylene oxide, then the polyoxyalkylene polyol product will have a higher primary hydroxyl content, and thus will not be a high secondary hydroxyl polyol as required by the claims.

It must be understood that when the final oxyalkylation is conducted with all propylene oxide, the actual alkylene oxide mixture will still contain a small amount of ethylene oxide. Thus, by the final oxyalkylation being conducted with higher alkylene oxide alone is meant that the content of ethylene oxide during this phase of oxyalkylation is such that the secondary hydroxyl content of the finished product is substantially the same as would be prepared in the total absence of a purposefully added co-feed of ethylene oxide. In other words, the final alkylene oxide feed is substantially all propylene oxide or other higher alkylene oxide. Such oxypropylation results in formation of a substantially homopolyoxypropylene cap.

Initiators suitable for use in preparing the polyoxyalkylene polyols of the subject invention include those conventionally used in polyurethane polyol and nonionic surfactant production. Examples include, but are not limited to, ethylene glycol, diethylene glycol, triethylene glycol, propylene glycol, dipropylene glycol, tripropylene glycol, 1,3-propanediol, 1,4-butanediol, 1,6-hexanediol; trihydric initiators such as glycerine, trimethylolpropane, trimethylolethane; tetrahydric initiators such as pentaerthyritol; hexahydric initiators such as sorbitol, and other saccarides; and octahydric initiators such as sucrose. Other initiators such as oxyalkylated amines, oxyalkylated diamines, and the like, for example tetrakis[2-hydroxyalkyl]ethylene diamines, and various alkylated anilines and methylenedianilines may be used. Oligomeric oxyalkylation products of all of the above may also be used, and in many cases are preferred. For use as surfactants, monofunctional initiators such as methanol, butanol, n-octanol, nonylphenol, and the like may be used. However, in such cases, the presence of high molecular weight tail must be assessed.

It has been rather surprisingly found that the same DMC catalyst may produce a high molecular weight tail when used in one form whereas it will not when used in another form. For example, when charged to the reactor in paste form, a high molecular weight tail may be obtained whereas the same catalyst in powder form may not produce a tail and vice versa. It is possible that in some instances the length and/or nature of storage of the catalyst may impact its tail-producing propensity. In such cases, if a given form of catalyst is known to produce a high molecular weight tail after storage for a known or unknown period of time, then it may be desired to employ the subject invention process with all high secondary hydroxyl polyols produced using the catalyst, or to use the subject invention process with all polyol production where storage exceeds a particular storage time. By the term "in need thereof" it respect to mitigating the effect of a high molecular weight tail in polyol production is meant polyol production where without use of the subject invention, a substantially all-higher alkylene oxide, i.e. propylene oxide hydrophobic tail is known to be produced, or whose production is anticipated.

Examples of DMC catalysts which may be employed to produce low or ultra-low polyether polyols which should be examined for the presence of a high molecular weight tail include those disclosed in U.S. Pat. Nos. 5,100,997; 5,158,922; 5,470,812; and 5,482,908, which are herein incorporated by reference. The DMC catalysts must be capable of preparing a polyoxyalkylene polyol with an amount of monol, as reflected by the allylic unsaturation present, of less than 0.015 meq/g, preferably less than 0.012 meq/g, more preferably less than 0.010 meq/g, and most preferably about 0.003 to 0.007 meq/g or less. Polyols having unsaturations in the range of 0.012 to 0.015 meq/g may be termed "low unsaturation polyols." Polyols with unsaturations of less than 0.010 meq/g are termed "ultra-low unsaturation polyols." It has been surprisingly discovered that the behavior of ultra-low unsaturation polyols is quantitatively different and often unpredictable as compared to low unsaturation polyols.

Having generally described this invention, a further understanding can be obtained by reference to certain specific examples which are provided herein for purposes of illustration only and are not intended to be limiting unless otherwise specified.

Critical Foam Formulation Testing

The presence or absence of a deleterious high molecular weight tail in a polyoxypropylene polyol used in polyurethane foams may be qualitatively assessed by employing the polyol in a highly stressed hand-mixed foam formulation. In this test, a foam prepared from a given polyol is reported as "settled" if the foam surface appears convex after blow-off and is reported as collapsed if the foam surface is concave after blow-off. The amount of collapse can be reported in a relatively quantitative manner by calculating the percentage change in a cross-sectional area taken across the foam. The foam formulation is as follows: polyol, 100 parts; water, 6.5 parts; methylene chloride, 15 parts; Niax® A-1 amine-type catalyst, 0.03 parts; T-9 tin catalyst, 0.4 parts; L-550 silicone surfactant, 0.5 parts. The foam is reacted with a mixture of 2,4- and 2,6-toluenediisocyanate at an index of 110. The foam may be conveniently poured into a standard 1 cubic foot cake box, or a standard 1 gallon ice cream container. In this formulation, conventionally prepared, i.e. base catalyzed polyols having high secondary hydroxyl cause the foam to settle approximately 5–10%, whereas polyols prepared from DMC catalysts exhibiting high molecular weight tails as disclosed in the present invention, cause the foam to collapse by approximately 40–70%. A change of greater than 40% is considered collapse.

Analytical Procedure for Determining High Molecular Weight Tail

The analytical procedure useful for obtaining the quantity of high molecular weight tail in a given DMC catalyzed polyol is a conventional HPLC technique, which can easily be developed by one skilled in the art. The molecular weight of the high molecular weigh, fraction may be estimated by comparing its elution time in the GPC column with that of a polystyrene standard of appropriate molecular weight. For example, a polystyrene of 100,000 molecular weight has been found appropriate for most analyses. As is well known, high molecular weight fractions elute from a GPC column more rapidly than lower molecular weight fractions, and to aid in maintaining a stable baseline, it is appropriate following the elution of the high molecular weight fraction, to divert the remainder of the HPLC eluate to waste, rather than allowing it to pass through the detector, overloading the latter. Although many suitable detectors may be utilized, a convenient detector is an evaporative light scattering detector (ELSD) such as those commercially available.

In the preferred analysis method, a Jordi Gel DVB $10^3$ Angstrom column, 10×250 mm, 5 micron particle size, is employed with a mobile phase which consists of tetrahydrofuran. The detector used is a Varex Model IIA evaporative light scattering detector. Polystyrene stock solutions are made from 591,000 Da molecular weight polystyrene by appropriate dilution with tetrahydrofuran, to form standards containing 2, 5, and 10 mg/L of polystyrene. A molecular weight calibration standard was prepared from 100,000 Da molecular weight polystyrene in a similar manner.

Samples were prepared by weighing 0.1 gram of polyether into a 1 ounce bottle, and adding tetrahydrofuran to the sample to bring the total weight of sample and tetrahydrofuran to 10.0 grams. Samples of the 2, 5, and 10 mg/L polystyrene solutions and 100,000 molecular weight calibration solution are sequentially injected into the GPC column. Duplicates of each polyol sample solution are then injected, following by a reinjection of the various polystyrene standards. The peak areas for the polystyrene standards are electronically integrated, and the electronically integrated peaks for the two sets of each candidate polyol are electronically integrated and averaged. Concentration of the high molecular weight tail in ppm is then performed by standard data manipulation techniques.

Polyol Preparation

In the examples which follow, a series of polyols were made by the same general procedure. The starter, or initiator, is a KOH base-catalyzed oxypropylation product of glycerine having a molecular weight of about 690 to 720, which has been refined by conventional techniques to remove residual traces of KOH. The catalysts utilized are ultra-low unsaturation-producing DMC catalysts as disclosed in U.S. Pat. Nos. 5,470,813 and 5,482,908. The particular method of catalyst preparation is not part of, nor relevant to the subject invention. All catalysts are non-stoichiometric, substantially amorphous, zinc hexacyanocobaltate T-butanol complexes, with or without additional complexing agents. Detailed preparation of suitable catalysts may be referred to the preceding patents, which are herein incorporated by reference.

An amount of starter is added to a stainless steel reactor, and sufficient catalyst mixed with the starter to yield either 25 ppm or 30 ppm, respectively, of catalyst on a solids basis in the final polyoxyalkylene product. The catalyst is activated by adding propylene oxide to the reactor and carefully observing the pressure in the reactor, as disclosed in the preceding U.S. patents. A drop in pressure indicates that the catalyst has been activated. Following activation, propylene oxide and ethylene oxide feed rates are increased to the final feed rates in a period of about 30 or more minutes, the co-feed in these examples being approximately 83/17 propylene oxide/ethylene oxide. After feeding in the total amount of propylene oxide/ethylene oxide co-feed, the final addition of substantially all propylene oxide is fed to produce a homopolyoxypropylene cap of the desired percentage weight. The total oxide feed time is approximately 6.5 hours. Following addition of propylene oxide, the reactor is held at about 130° C. for 90 minutes to consume unreacted propylene oxide. The polyol is then cooled to 80° C. and transferred to a holding vessel, following which anti-oxidant may be added if desired, and the polyol filtered to remove large particles.

In the following examples, three catalysts were generally utilized, catalyst #1 is a powdered DMC catalyst utilized at a concentration of 25 ppm; catalyst #2 is a paste DMC catalyst utilized at a concentration of 25 ppm; while catalyst #3 is chemically different from catalysts 1 and 2 and is utilized at a concentration of 30 ppm.

COMPARATIVE EXAMPLES C1 to C3

Three polyols were prepared substantially as in the procedure disclosed previously, however, in place of the homopolyoxypropylene cap, the entire oxyalkylation was conducted with an 83/17 ratio of propylene oxide/ethylene oxide. In Comparative Example C1, no heel was utilized, whereas in Comparative Examples C2 and C3, 8% heels, i.e. approximately 8% of the reactor volume contained polyol from the previous batch, was utilized. Each of these comparative polyols, having no polyoxypropylene cap, were found to pass the highly stressed foam test. The results are indicated in Table 1.

EXAMPLES 4–13

These Examples were performed as in the preceding Examples, with varying amounts of propylene oxide cap, and with varying amounts and types of catalysts. Some reactions were performed with the reactor containing a heel of a prior reaction. The presence or absence of a heel had no significant effect on the amount of high molecular weight tail or the evaluation of foams prepared from the polyol in the stressed foam test. It is noteworthy that in all of the Examples and Comparative Examples herein, a high molecular weight tail was detected in amounts ranging from about 167 ppm to 686 ppm. The results are printed in Table 1.

TABLE 1

| Example | PO Cap, Wt % | Catalyst, Amount (type) | High MW Tail Results, ppm | Initial Foam Results[1] |
| --- | --- | --- | --- | --- |
| C1 | 0.0% | 25 ppm (2) | 281 | Pass, 20% |
| C2 | 0.0% | 25 ppm (2) | 238 | Pass, 6% |
| C3 | 0.0% | 30 ppm (3) | 266 | Pass, 9% |
| 4 | 25.0% | 25 ppm (1) | 225 | Fail, 50%[2] |
| 5 | 25.0% | 25 ppm (2) | — | Fail, 70% |
| 6 | 25.0% | 30 ppm (3) | 228 | Pass, 14% |
| 7 | 12.5% | 25 ppm (1) | 686 | Fail, 46% |
| 8 | 12.5% | 25 ppm (2) | 341 | Fail, 58% |
| 9 | 12.5% | 30 ppm (3) | 167 | Pass, 9% |
| 10 | 6.5% | 25 ppm (1) | 240 | Pass, 20% |
| 11 | 6.5% | 25 ppm (2) | 220 | Pass, 11% |
| 12 | 6.5% | 25 ppm (2) | 255 | Pass, 7% |
| 13 | 6.5% | 25 ppm (3) | 228 | Pass, 15% |

[1]Using the highly stressed foam formulation
[2]Percent Settle, if greater than −40% the foam collapsed As can be seen from Table 1, preparation of polyoxyalkylene polyols having high secondary hydroxyl group content by DMC catalysis does not always result in polyols which exhibit foam collapse in the highly stressed foam test. This may be due to a lesser content of the high molecular weight tail in parts per million, or to the nature of the high molecular weight tail itself, i.e. its relative hydrophobicity or hydrophilicity, or both. As the highly stressed foam test is somewhat qualitative, it is quite possible that other stressed formulations may show collapse where the present formulation does not. Polyols with no homopolyoxypropylene cap uniformly pass the highly stressed foam test, despite having moderate levels or high molecular weight tail, i.e. 238 to 281 ppm. With a 6.5% homopolyoxypropylene cap, the amount of high molecular weight tail was substantially the same, i.e. from 220 to 255 ppm, and again, all polyols passed the highly stressed foam test.

In Examples 7–9, with a homopolyoxypropylene cap of 12.5 weight percent, polyols prepared from the Type 1 and Type 2 catalysts at 25 ppm concentration both failed the test, with substantial foam collapse. Moreover, the amount of high molecular weight tail in both these examples is relatively high, 686 ppm and 341 ppm.

With a higher propylene oxide cap, 25%, as illustrated in Examples 4–6, again, the polyol prepared from the Type 3 catalyst passed the highly stressed foam test, although having a high molecular weight tail portion of 228 ppm. Examples 4 and 5, however, failed the test with substantial foam collapse, despite the fact that the amount of high molecular weight tail itself, 225 ppm, is not substantially different from those other foams that passed the test. The fact that the amount of high molecular weight tail itself can be the same, and yet some foams pass the test while some fail, indicates that it is the nature of the high molecular weight tail, which is responsible for foam collapse in these cases, and not the amount. Ideally, it would be desirable to produce a polyol with no high molecular weight tail, however, viewing the results, it appears that this desired goal will have to wait for the development of new catalysts and/or new processes.

Having now fully described the invention, it will be apparent to one of ordinary skill in the art that many changes and modifications can be made thereto without departing from the spirit or scope of the invention as set forth herein.

What is claimed is:

1. A high secondary hydroxyl group-content polyoxypropylene polyol prepared by the double metal cyanide catalyzed oxypropylation of a suitably hydric initiator having a cap comprising polymerized propylene oxide moieties, said polyol comprising in most major part a polyoxypropylene polyol having an average equivalent weight of from about 1000 Da to about 15,000 Da and a random, internal oxyethylene content of from about 0.5 weight percent to about 15 weight percent and a polyoxyalkylene tail having an average molecular weight greater than about 80,000 Da, said tail containing oxypropylene and oxyethylene moieties, said polyoxypropylene polyol having a homopolyoxypropylene cap which constitutes less than about 15 percent by weight of said polyol.

2. The polyoxypropylene polyol of claim 1 has a random oxyethylene content of from about 0.5 weight percent to about 12 weight percent based on he weight of said polyoxypropylene polyol.

3. The polyoxypropylene polyol of claim 1 wherein said polyoxypropylene polyol has a random oxyethylene content of about 12 weight percent based on the weight of said polyoxypropylene polyol.

4. The polyoxypropylene polyol of claim 1 wherein said polyoxypropylene polyol has a random oxyethylene content of less than about 12 weight percent based on the weight of said polyoxypropylene polyol and wherein said homopolyoxypropylene cap comprises no more than about 12.5 weight percent based on the weight of said polyoxypropylene polyol.

5. The polyoxypropylene polyol of claim 1 wherein said polyoxypropylene polyol has a random oxyethylene content of less than about 12 weight percent based on the weight of said polyoxypropylene polyol and wherein said homopolyoxypropylene cap comprises no more than about 8 weight percent based on the weight of said polyoxypropylene polyol.

6. The polyoxypropylene polyol of claim 1 wherein at least a portion of said tail of said polyoxypropylene polyol has a molecular weight of about 100,000 Da or more.

7. The polyoxypropylene polyol of claim 1 wherein said oxyethylene moieties are introduced into said polyoxypropylene polyol by oxyalkylating with an admixture of alkylene oxides containing ethylene oxide and propylene oxide during at least 80% of the total oxyalkylation in the presence of said double metal cyanide catalyst.

8. The polyoxypropylene polyol of claim 1 wherein the unsaturation of the polyol is less than about 0.010 meq/g.

9. A process for the preparation of a double metal cyanide catalyzed, high secondary hydroxyl group polyoxypropylene polyol by oxyalkylating one or more suitably hydric initiator molecules with propylene oxide and optionally one or more higher alkylene oxides to produce a high molecular weight tail-containing polyoxypropylene polyol having a decreased propensity for phase-out during polyurethane formation, said process comprising:

oxyalkylating one or more suitably hydric initiator molecules with an alkylene oxide oxyalkylation mixture in the presence of an effective amount of one or more double metal cyanide catalysts, wherein during at least about 80 percent or more of said oxyalkylating, ethylene oxide is present in said oxyalkylation mixture together with one or more higher alkylene oxides such that oxyethylene moieties are present as random internal oxyethylene moieties in an amount of up to about 15 weight percent of the polyoxypropylene polyol weight, and during a terminal portion of said oxyalkylating said oxyalkylation mixture comprises substantially solely higher alkylene oxide, said oxyalkylation mixture during said terminal portion contributing not more than about 15 weight percent of the total polyoxypropylene polyol weight; and recovering a high secondary hydroxyl group-content low unsaturation polyoxyalkylene polyol comprising a most major portion having an equivalent weight of between about 1000 Da and 15,000 Da, and a high molecular weight polyoxyethylene/higher polyoxyalkylene polyether tail having a molecular weight greater than about 80,000 Da.

10. The process of claim 9 wherein the unsaturation of the high secondary hydroxyl group polyoxypropylene polyol is less than about 0.010 meq/g.

11. The process of claim 9 wherein the molecular weight of the high molecular weight tail is about 100,000 Da or more.

12. The process of claim 9 wherein the weight percent ethylene oxide in said polyoxypropylene polyol is less than about 12% and the polyol contains a substantially homopolyoxypropylene cap constituting from about 5 weight percent to about 12.5 weight percent of said polyol weight.

* * * * *